Dec. 30, 1941.                H. A. MANTZ                2,267,742
                       THERMOCOUPLE AND PILOT BURNER
                       Filed April 13, 1939        4 Sheets-Sheet 1

INVENTOR.
Harold A. Mantz
BY
Brown, Jackson, Boettcher & Dienner
ATTORNEYS.

Inventor:
Harold A. Mantz.
By Brown, Jackson, Boettcher & Dienner
Attys.

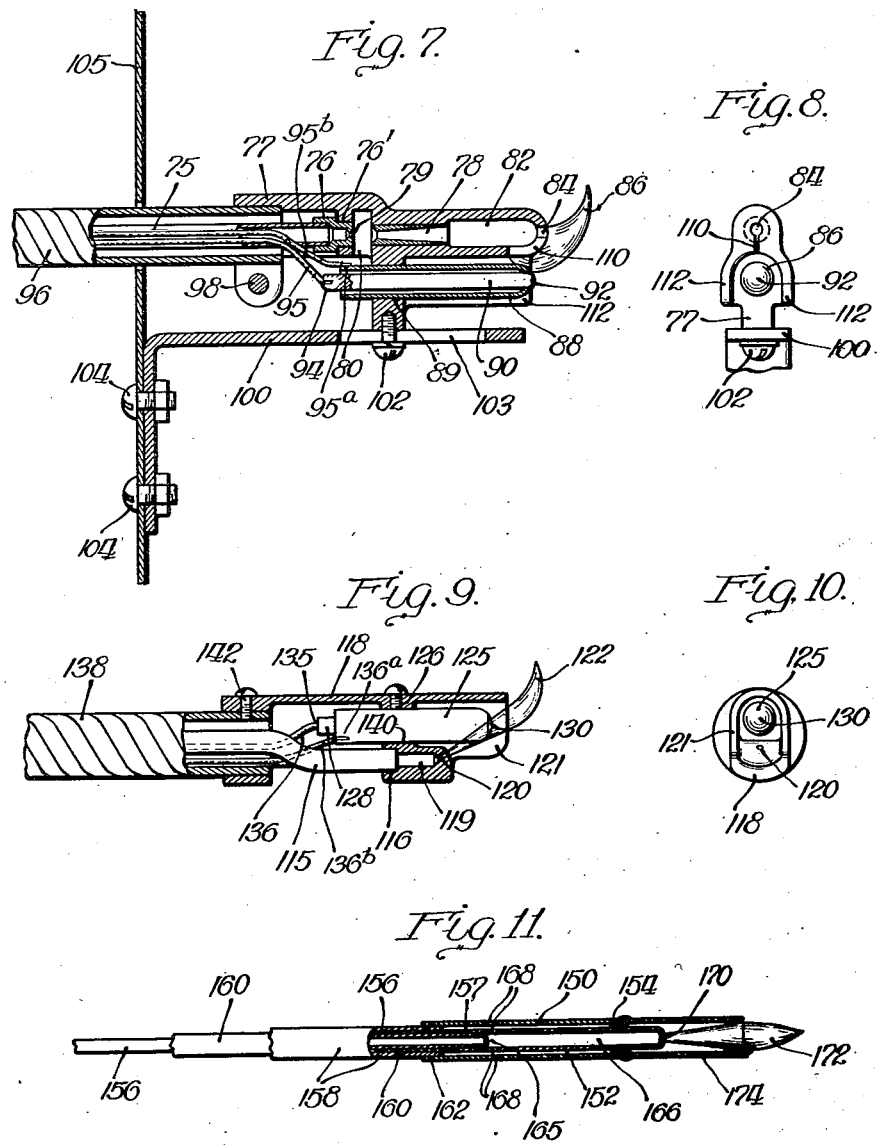

Dec. 30, 1941.    H. A. MANTZ    2,267,742
THERMOCOUPLE AND PILOT BURNER
Filed April 13, 1939    4 Sheets-Sheet 4
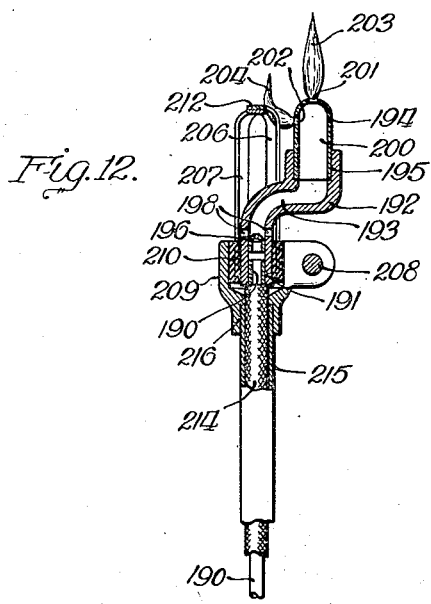
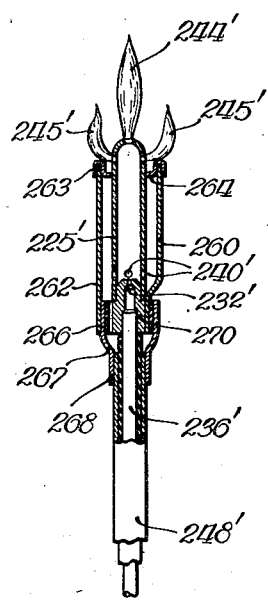
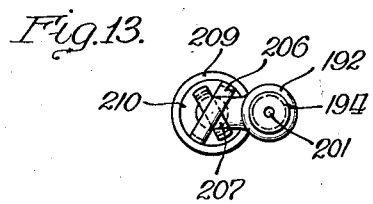
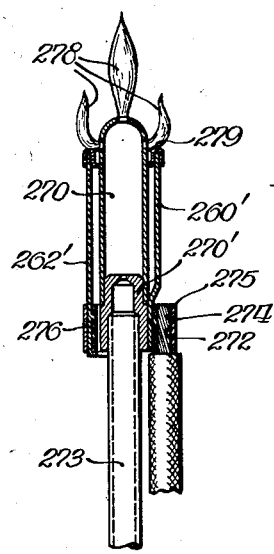
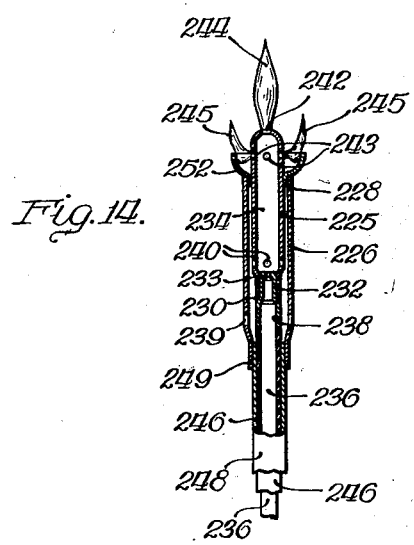
INVENTOR.
Harold A. Mantz
BY
Brown, Jackson, Boettcher & Dienner
ATTORNEYS.

Patented Dec. 30, 1941

2,267,742

UNITED STATES PATENT OFFICE 2,267,742

THERMOCOUPLE AND PILOT BURNER

Harold A. Mantz, Milwaukee, Wis., assignor to Milwaukee Gas Specialty Company, Milwaukee, Wis., a corporation of Wisconsin Application April 13, 1939, Serial No. 267,733

5 Claims. (Cl. 136—4)

This invention relates to a thermocouple and pilot burner.

One of the main objects of the invention is to provide a combined thermocouple and pilot burner which is effective and reliable in operation and, at the same time, is simple and compact in construction and relatively inexpensive to build, assemble, and install.

It is also an object of the invention to provide a thermocouple and pilot burner as a unitary assembly that may be mounted as a unit, and in which the desired position of the thermocouple relative to the pilot flame is at all times assured; also a device of the character set forth having an improved relation and improved forms of connection between the various parts.

Further objects and advantages of the invention will appear from the following detailed description, taken in connection with the accompanying drawings in which:

Figure 7 is a longitudinal section through another embodiment of the invention;

Figure 8 is an end view of the device shown in Figure 7;

Figure 9 is a longitudinal section through another embodiment of the invention;

Figure 10 is an end view of the device shown in Figure 9;

Figure 11 is a longitudinal section through another embodiment of the invention;

Figure 12 is a longitudinal section through another embodiment of the invention;

Figure 13 is an end view of the device shown in Figure 12; and

Figures 14, 15, and 16 are longitudinal sections through further embodiments of the invention.

Figure 1:
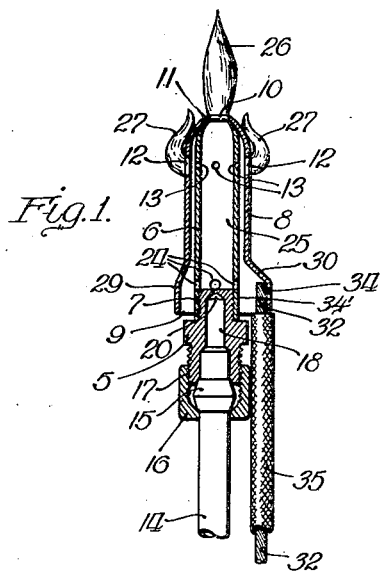
Figure 1 is a detail longitudinal section through a combined thermocouple and pilot burner embodying the present invention.
Figure 2:
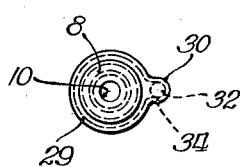
Figure 2 is an end view of the device shown in Figure 1.

Referring now in detail to the drawings, the embodiment of the invention shown in Figures 1 and 2 comprises a hollow metallic pilot head 5. An internal metallic tubular thermocouple member 6 is screwed at 7 onto the pilot head 5. Disposed in spaced relation about the internal thermocouple element is an external metallic tubular thermocouple element 8 formed of dissimilar material with respect to the internal thermocouple element, as well understood in the art, and open at its inner end at 9.

The outer ends of the internal and external thermocouple elements 6 and 8 have registering openings providing a port 10, and are joined adjacent the port 10 to form a thermal junction at 11 which is adapted to be heated by the pilot burner. The external thermocouple element 8 is provided with a plurality of relatively large laterally opening ports 12, and the internal thermocouple element 6 is provided with a plurality of ports 13 aligned with the ports 12 and of reduced area as compared with the ports 12.

The fuel supply tube 14 is provided at its inner end with a compression enlargement at 15, and a compression nut 16 screwed upon the pilot head at 17 and cooperating with the compression enlargement 15 clamps the end of the tube 14 to the pilot head 5 with the interior of the tube 14 opening into the passage 18 in the pilot head. The outer end of the pilot head is provided with a restricted orifice 20. The tube 14 is metallic and not only supplies fuel to the pilot burner, but constitutes a thermo-electric lead connection for the internal thermocouple element 6, being thermo-electrically connected therewith through the metallic pilot head and the compression nut.

The lead tube 14 may be connected, for example, with one side of the electromagnet of a safety control device of the general character disclosed in John H. Thornbery and Harold A. Mantz Patent No. 2,126,587, granted August 9, 1938, or it may be connected in circuit with any other suitable or preferred device. The interior of the lead tube 14 is suitably connected with the fuel supply line as shown, for example, in the copending application of Guido Wunsch and Josef Schuppert, filed August 3, 1934, Serial No. 738,370; also in the copending application of Harold A. Mantz, filed January 8, 1937, Serial No. 119,557; and in the copending application of Theodore A. Wetzel, filed April 12, 1937, Serial No. 136,291, or in any other suitable or preferred manner.

Where the fuel is of a character, such as gas, requiring admixture of air therewith, the air necessary to provide the desired gaseous mixture is admitted through air inlets 24 opening laterally through the internal thermocouple element. The air admitted through the inlets 24 and the fuel that issues from the orifice 20 pass outwardly into the mixing chamber 25 formed within the internal thermocouple element 6. The resulting gaseous mixture passes axially through the port 10 and, when ignited, forms the pilot flame indicated at 26, and also out laterally through the ports 12 and 13 and, when ignited, forms pilot flames 27 which sweep against the outer end of the thermocouple adjacent the hot junction 11.

The inner open end of the external tubular element 8 is enlarged at 29, and the enlarged open end 29 has a lateral recess 30 for receiving the bared end of a flexible lead conductor 32 which is joined at 34 to the element 8 to form a cold thermal junction. The attachment of the inner end of the internal tubular element 6 to the pilot head 5 forms a second cold thermal junction at 34'.

The flexible lead conductor 32, which is preferably covered with insulation as indicated at 35, extends to the position where it is connected in circuit with the other side of the electromagnet of the safety control or other device. In practice, the tubular lead member 14 is preferably sufficiently flexible to permit it to be bent or turned to different positions to position the thermocouple and pilot burner as desired, the flexibility of the conductor 32 permitting it to be turned or bent to the position of the thermocouple and pilot burner. At the same time, the lead 14 may be of a character to support the thermocouple and pilot burner after it is bent or turned to the desired position, although, of course, supporting brackets for supporting the thermocouple and pilot burner may be employed and, therefore, are contemplated within the scope of this invention.

In one illustrative use of the device, the pilot burner is mounted in juxtaposition to a main burner (not shown) for the purpose of igniting the same. As long as the pilot flames are burning, the thermo-electric current set up thereby energizes the electromagnet to hold the safety control device in operating position. Upon extinguishment of the pilot flame the electromagnet ceases to be energized sufficiently to hold the safety control device in operating position, and said control device moves to a safety position shutting off the fuel supply to the burner. This is all fully shown and described in the patent and copending applications herein mentioned, and therefore detailed illustration and description of the same will not be repeated here.

The embodiment of the invention illustrated in Figures 3 and 4, except as will hereinafter appear, is similar to the embodiment illustrated in Figures 1 and 2, and like parts are indicated by primed reference characters corresponding with the reference characters used in Figures 1 and 2.

Figure 3:
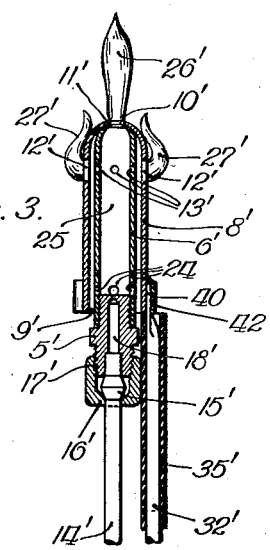
Figure 3 is a section similar to Figure 1, through another embodiment of the invention.
Figure 4:
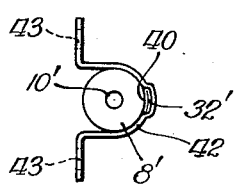
Figure 4 is an end view of the device shown in Figure 3.

In the embodiment shown in Figures 3 and 4, the bared end of the flexible lead conductor 32', instead of being joined to the external tubular thermocouple element 8' internally thereof as in the preceding embodiment, is flattened and joined to the element 8' externally thereof at 40 to form a cold thermal junction. A bracket 42 embraces the inner open end of the element 8' and the adjacent end of the lead 32' to hold or assist in holding the lead to the element 8' at the junction 40. The opposite ends of the bracket 42 are turned out and apertured at 43 (Figure 4) for attachment of the bracket to a suitable support, the bracket serving to support the thermocouple and pilot burner in the desired position adjacent the main burner (not shown).

Figure 5:
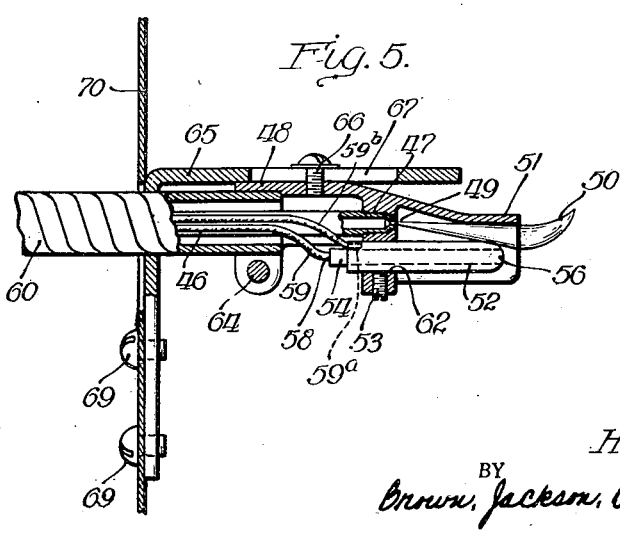
Figure 5 is a longitudinal section through another embodiment of the invention.
Figure 6:
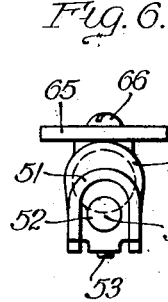
Figure 6 is an end view of the device shown in Figure 5.

In the embodiment of the invention illustrated in Figures 5 and 6, the outer end of the metallic tubular fuel supply lead 46 is secured at 47 in a metallic bracket member 48. The fuel supplied by the tube 46, which is preferably flexible to permit bending or turning the same or leading it around corners for disposition of the thermocouple and pilot burner as desired, passes outwardly through a port 49, and when ignited, forms a pilot flame as indicated at 50. The bracket 48 has an integral inverted and generally channel or U-shaped shield 51 which confines the pilot flame so that the hot junction of the thermocouple will be subject to the heat of the pilot flame as long as the pilot burner is lighted.

The thermocouple comprises an external metallic tubular thermocouple element 52 clamped at 53 in the bracket 48 and an internal thermocouple element 54 formed of dissimilar material and joined to the outer end of the external thermocouple element to form a thermal junction 56 adapted to be heated by the pilot flame 50. The projecting inner end of the internal thermocouple element 54 is joined at 58 to a conducting lead 59 which extends to the desired position and is connected directly to one lead of the coil of the magnet frame (not shown). The inner end of the external thermocouple element 52 is joined at 59a to a second conducting lead 59b which extends to the desired position and is connected directly to the other lead of the coil of the magnet frame of the electromagnet.

The junctions at 58 and 59a constitute the cold junctions of the thermocouple. The tube 46 is preferably enclosed by an outer tubular casing 60. The lead conductors 59 and 59b preferably extend through the tubular casing 60, although this may vary.

Figure 5A:
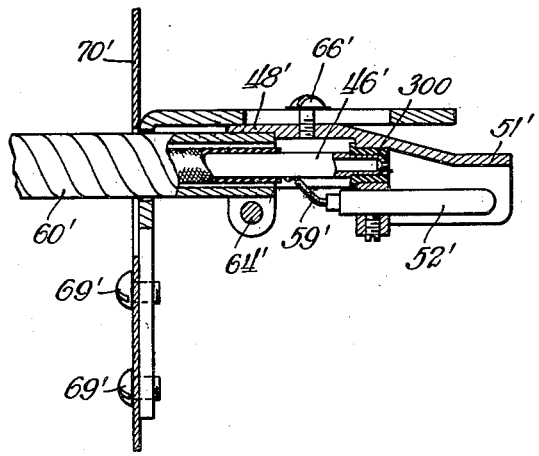
Figure 5A is a section similar to Figure 5, showing an alternative form of lead connection for the device shown in Figure 5.

In Figure 5A the lead conductor 59', instead of extending to the coil of the electromagnet and being connected with the lead of such coil, may be a short lead connected to the metallic fuel supply tube 46', this tube 46', in addition to supplying fuel for the burner, then extending to the desired position and being connected to one lead of the coil of the electromagnet so as to constitute one of the lead conductors. In that case, the spud forming outer end of the tube 46' may be insulated at 300 from the bracket 48' and the lead 59b of the embodiment of the invention shown in Figure 5 may be omitted by connecting the tubular casing 60' in circuit with the external thermocouple element 52' through the bracket 48' so that the casing 60' will then constitute the lead conductor between the other lead of the coil of the electromagnet and the external thermocouple element 52'.

The bracket 48 is clamped at 64 to the outer end of the tubular casing 60 and is supported upon an angular supporting bracket 65 by a screw 66 which cooperates with a slot 67 in the extending leg of the bracket to permit adjustment of the position of the thermocouple and pilot burner. The depending leg of the bracket 65 is secured at 69 to the wall 70, which may be the wall of a space heater, hot water heater, or any other suitable heater, or the part indicated at 70 may be any other suitable support.

In the embodiment of the invention illustrated in Figures 7 and 8, the metallic tubular fuel supply tube 75, which is preferably flexible for the purposes hereinbefore set forth, is secured in a jet member 76, which jet member in turn is secured at 76' in the metallic bracket 77. A venturi 78 is mounted in the bracket 77 in axial alignment with the orifice 79 at the outer end of the jet member 76 and spaced outwardly therefrom. Where the fuel is of a character, such as gas, requiring admixture of air therewith, the air necessary to provide the desired gaseous mixture is admitted through an air inlet at 80. The air admitted through the inlet 80 and the fuel that issues from the orifice 79 pass outwardly through the venturi 78 into the mixing chamber 82. The resulting gaseous mixture passes outwardly through a port 84 at the outer end of the tubular portion of the bracket 77 and, when ignited, forms the pilot flame indicated at 86.

The thermocouple comprises an external metallic tubular thermocouple element 88 secured at 89 in the bracket 77 and an internal thermocouple element 90 formed of dissimilar material and joined to the outer end of the external thermocouple element to form a thermal junction 92 adapted to be heated by the pilot flame 86. The projecting inner end of the internal element 90 is joined at 94 to a conducting lead 95 which extends to the desired position and is connected directly to one lead of the coil of the magnet frame (not shown). The inner end of the external thermocouple element 88 is joined at 95a to a second conducting lead 95b which extends to the desired position and is connected directly to the other lead of the coil of the electromagnet.

The junctions at 94 and 95a constitute the cold junctions of the thermocouple. The tube 75 is preferably enclosed by an outer tubular casing 96. The lead conductors 95 and 95b preferably extend through the casing 96, although this may vary.

Figure 7A:
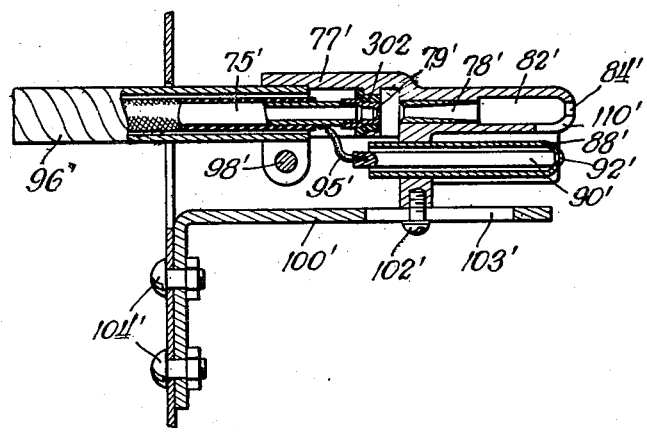
Figure 7A is a section similar to Figure 7, showing an alternative form of lead connection for the device shown in Figure 7.

In Figure 7A the lead conductor 95', instead of extending to the coil of the electromagnet and being connected with the lead of such coil, may be a short lead connected with the metallic fuel supply tube 75', this tube 75', in addition to supplying fuel for the burner, then extending to the desired position and being connected to one lead of the coil of the electromagnet. As before, in that case the spud forming outer end of the tube 75' may be insulated at 302 from the bracket 77' and the lead 95b of the embodiment of the invention shown in Figure 7 may be omitted by connecting the tubular casing 96' in circuit with the external thermocouple element 88' through the bracket 77' so that the casing 96' will constitute the lead conductor between the other lead of the coil of the electromagnet and the external thermocouple element 88'.

The bracket 77 is clamped at 98 to the outer end of the tubular casing 96 and is supported upon an angular bracket 100, being shown as mounted thereon by means of a screw 102 which cooperates with a slot 103 in the extending leg of the bracket to permit adjustment of the position of the thermocouple and pilot burner. The depending leg of the bracket 100 is secured at 104 to the wall 105, which may be the wall of a space heater, hot water heater, or any other suitable heater, or the part indicated at 105 may be any other suitable support.

The outer end of the tubular portion of the bracket 77 has a narrow slot 110 opening inwardly from the port 86 through which the pilot flame is directed upon the junction 92 of the thermocouple. The bracket 77 has integral depending flanges 112 extending down along opposite sides of the thermocouple so that the pilot flame which is directed through the slot 110 is confined and proper heating of the thermocouple at all times thereby assured.

In the embodiment of the invention illustrated in Figures 9 and 10, the metallic tubular fuel supply lead 115 is secured at 116 in a metallic bracket member 118. The fuel supplied by the tube 115, which is preferably flexible to permit bending or turning the same or leading it around corners for disposition of the thermocouple and pilot burner as desired, passes outwardly into a passage 119 formed in the depending portion of the bracket 118 and is directed obliquely through an oblique port 120 toward the outer end of the thermocouple. The bracket 118 has an integral inverted or generally channel or U-shaped shield 121 into which the pilot flame, indicated at 122, is directed, so that the hot junction of the thermocouple will be subject to the heat of the pilot flame as long as the pilot burner is lighted.

The thermocouple comprises an external metallic tubular thermocouple element 125 secured at 126 in the bracket 118 and an internal thermocouple element 128 joined to the outer end of the external thermocouple element to form a thermal junction 130 adapted to be heated by the pilot flame 122. The thermocouple is disposed longitudinally within the shield 121, and the projecting inner end of the internal thermocouple element 128 is joined at 135 to a conducting lead 136 which extends to the desired position and is connected directly to one lead of the coil of the electromagnet. The inner end of the external thermocouple element 125 is joined at 136a to a second lead conductor 136b which extends to the desired position and is connected to the other lead of the coil of the electromagnet. A suitable helically wound or other flexible metallic casing 138 encloses the tube 115. The conductors 136 and 136b may extend through the casing 138, although this may vary. The junctions at 135 and 136a constitute the cold junctions of the thermocouple.

Figure 9A:
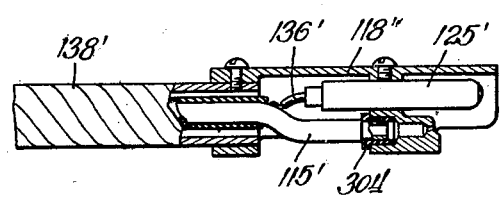
Figure 9A is a section similar to Figure 9, showing an alternative form of lead connection for the device shown in Figure 9.

In Figure 9A the lead conductor 136', instead of extending to the coil of the electromagnet and being connected with the lead of said coil, may be a short lead conductor connected to the metallic fuel supply tube 115', this tube, in addition to supplying fuel for the burner, then extending to the desired position and being connected to one lead of the coil of the electromagnet so as to constitute one of the lead conductors. In that case, as before, the outer end of the tube 115' may be insulated at 304 from the bracket 118', and the lead 136b of the embodiment of the invention shown in Figure 9 may be omitted by connecting the tubular casing 138' in circuit with the external thermocouple element 125' through the bracket 118', so that the casing 138' will constitute the lead conductor between the other lead of the coil of the electromagnet and the external thermocouple element 125'.

The bracket 118 is clamped at 142 to the outer end of the tubular casing 138. The flexible tubular casing 138 serves to support the thermocouple and pilot burner in the desired position notwithstanding its flexibility and the flexibility of the tubular lead 115, but it is to be understood that supporting bracket means may be provided as suitable or desired.

In the embodiment of the invention illustrated in Figure 11, the thermocouple comprises an external tubular metallic thermocouple element 150 and an internal tubular thermocouple element 152 of dissimilar material disposed within the element 150 and joined to the outer end of the external element to form a thermal junction at 154 adapted to be heated by the pilot flame.

The internal metallic tubular lead 156 is joined at its forward end to the interior of the inner end of the internal thermocouple element 152 at 157 and is disposed coaxially with respect to the element 152. The tubular lead conductor 156 is enclosed within an external metallic tubular lead conductor 158, being insulated therefrom by insulation indicated at 160, and the outer end of the lead conductor 158 is joined to the inner end of the external element 150 at 162. The junctions at 157 and 162 constitute the cold junctions of the thermocouple.

The lead conductors 156 and 158 are connected at their opposite ends to the terminals of the safety control or other device as previously described, and the inner lead conductor is connected with the fuel supply line as previously set forth or otherwise, and supplies fuel to the pilot burner. At its forward end the internal lead 156 has an axial orifice 165 through which the fuel passes into the mixing chamber 166 within the internal element 152. Where the fuel is of a character, such as gas, requiring admixture of air therewith, the air necessary to form the desired gaseous mixture is admitted through air inlets 168 which open laterally through the thermocouple elements 150 and 152, as shown. The gaseous mixture of air admitted through the inlet 168 and fuel that issues from the orifice 165 pass outwardly through a port 170 at the outer end of the internal element 152, and, when ignited, forms the pilot flame indicated at 72. A tubular metallic heat conductor 174, secured at its inner end to the thermocouple adjacent the junction 154, projects outwardly from the outer end of the internal element 152 and conducts heat from the pilot flame 172 inwardly to the junction 154 as long as the pilot flame is burning.

The device shown in Figure 11 is adapted to be connected in circuit with the electromagnet of the safety control or other device and to be used in the manner set forth in connection with the preceding embodiments of the invention.

In the embodiment of the invention shown in Figures 12 and 13, the inner metallic fuel supply tube 190 is secured at 191 in the inner end of the metallic body member 192. The body member 192 has an internal passage 193, in the outer end of which the jet member 194 is secured at 195. The fuel supplied by the tube 190 passes through an orifice 196 into the passage 193. Where air is desired, it is admitted through air inlets 198. The air and fuel pass outwardly into the mixing chamber 200 and the gaseous mixture issues from an axial port 201 and lateral ports 202, and, when ignited, forms the pilot flames at 203 and 204.

The thermocouple comprises a pair of thermocouple elements 206 and 207 of generally U-shaped form and disposed with one at generally right angles to and within the other. At their inner ends the legs of the thermocouple elements 206 and 207 are clamped at 208 to the inner end of the body member 192, with the ends of the outer element 206 in contact with or joined to the metallic bracket 209 and the inner ends of the legs of the inner thermocouple element 207 in contact with or joined to the metallic body member 192. Insulation at 210 insulates the inner ends of the outer thermocouple element and bracket 209 from the inner ends of the inner thermocouple element and body member 192.

The outer ends of the thermocouple elements are joined to form a thermal junction 212 adapted to be heated by the pilot flame 204. The metallic tube 190, which connects one side of the control or other device to the thermocouple element 207 through the body 192, is insulated at 214, and the insulated tube is enclosed within an outer metallic tubular lead 215. The lead 215 is joined to the bracket 209 at 216 and connects the other side of the control or other device to the thermocouple element 206 through the bracket 209.

In the embodiment illustrated in Figure 14, the thermocouple comprises an inner metallic tubular thermocouple element 225 and an outer tubular metallic thermocouple element 226 joined to the inner element 225 to form a thermal junction 228 adapted to be heated by the pilot burner. A metallic jet member 230 joined to the inner end of the inner thermocouple element at 232, with the junction at 232 constituting one of the cold junctions of the thermocouple, has an orifice 233 opening axially into the mixing chamber 234 formed within the element 225.

The metallic fuel supply tube 236 is joined to the jet member 232 at 238 and delivers fuel into the internal thermocouple element through the orifice 233. Air, where desired, is admitted through ports 239 in the outer thermocouple element and ports 240 in the inner thermocouple element, and the gaseous mixture or other fuel passes outwardly through an axial port 242 and lateral port 243 and, when ignited, forms the pilot flames 244 and 245. The tube 236, which is insulated at 246, is enclosed within an outer metallic tubular lead 248 joined at 249 to the inner end of the outer thermocouple element 226, the junction at 249 constituting one of the cold junctions of the thermocouple.

A metallic heat conductor 252 is joined to the thermocouple at 228 and serves to confine the lateral flames 245 and to conduct heat from the pilot flames to the thermal junction 228 when the pilot burner is ignited. The tube 236 and tubular lead 248 connect the thermocouple elements thermoelectrically in the desired circuit as before, and, in this case, the inner thermocouple element constitutes directly the main pilot jet.

The embodiment shown in Figure 15 is similar to the embodiment shown in Figure 14 except that the tubular member 225' constitutes only the pilot jet and does not constitute the inner thermocouple element as in the preceding embodiment of the invention. The inner and outer thermocouple elements are indicated at 260 and 262, respectively. Their outer ends are joined to form the thermal junction 263 adapted to be heated by the pilot burner, and the member 264 constitutes a heat conductor for conducting heat from the pilot flames 245' to the thermal junction 263. The outer element 262 is joined at 266 to a metallic sleeve 267, which sleeve is, in turn, joined at 268 to the outer metallic tubular lead 260'. The other thermocouple element 260 is joined to the metallic jet member 270, which jet member in turn is joined to the metallic fuel supply tube 236'.

The embodiment of the invention illustrated in Figure 16 is similar to the embodiment illustrated in Figure 15 except that, instead of extending the lead conductor 272 as an outer tubular member over the metallic fuel supply tube, this lead conductor 272 is disposed externally of the fuel supply tube 273 and is joined at 274 to a clamping band or bracket 275 which, in turn, is joined at 276 to the thermocouple element 262'. The other thermocouple element 260' is joined to the metallic jet member 270 which, in turn, is joined to the fuel supply tube 273 as in the preceding embodiment of the invention.

The jet member 270', which is supplied with fuel by the tube 273, has ports for maintaining the pilot flames 278, and a heat conductor is shown at 279. As in the preceding embodiments of the invention, the tube 273 and lead 272 are adapted for connecting the thermocouple thermoelectrically to the desired control or other device, or in any other desired circuit.

The metallic sleeves 6 and 8 in the embodiment of the invention shown in Figures 1 and 2, and the corresponding parts in the other embodiments of the invention, constitute the burner head or pilot head as referred to in the claims.

I do not intend to be limited to the precise details shown or described.

I claim:

1. In combination, an inner metallic tubular thermocouple member having an inwardly rounded outer end provided with a port for a pilot flame, an outer metallic tubular thermocouple member surrounding said inner thermocouple member and having an inwardly rounded outer end provided with a port in register with said first mentioned port, the inwardly rounded outer end of said inner thermocouple member being joined to the inwardly rounded outer end of said outer thermocouple member peripherally about the edges of said ports to form a "hot" thermojunction for direct contact with the flame, a metallic fuel supply tube connected to the opposite end of said inner thermocouple member and constituting a thermoelectric lead conductor for said inner thermocouple member, the side wall of said outer thermocouple member being spaced from said inner thermocouple member for the entry of air therebetween, port means opening laterally through the wall of said inner thermocouple member at the inner end thereof for the entry of air into said inner thermocouple member from the space between said inner and outer thermocouple members, port means opening laterally through the walls of said inner and outer thermocouple members adjacent the outer ends thereof for maintaining flames which sweep over the rounded outer end of the outer thermocouple member adjacent said "hot" thermojunction, and lead conductor means for said outer thermocouple member.

2. In combination, an inner metallic tubular thermocouple member having an inwardly rounded outer end provided with a port for a pilot flame, an outer metallic tubular thermocouple member surrounding said inner thermocouple member and having an inwardly rounded outer end provided with a port in register with said first mentioned port, the inwardly rounded outer end of said inner thermocouple member being joined to the inwardly rounded outer end of said outer thermocouple member peripherally about the edges of said ports to form a "hot" thermojunction for direct contact with the flame, a metallic fuel supply tube connected to the opposite end of said inner thermocouple member and constituting a thermoelectric lead conductor for said inner thermocouple member, the side wall of said outer thermocouple member being spaced from said inner thermocouple member for the entry of air therebetween, port means opening laterally through the wall of said inner thermocouple member at the inner end thereof for the entry of air into said inner thermocouple member from the space between said inner and outer thermocouple members, port means opening laterally through the walls of said inner and outer thermocouple members adjacent the outer ends thereof for maintaining flames which sweep over the rounded outer end of the outer thermocouple member adjacent said "hot" thermojunction, and lead conductor means for said outer thermocouple member, the inner end of the outer thermocouple member having a lateral recess and the lead conductor means for said outer thermocouple member being joined to said outer thermocouple member internally thereof and within said recess.

3. In combination, an inner metallic tubular thermocouple member having an inwardly rounded outer end provided with a port for a pilot flame, an outer metallic tubular thermocouple member surrounding said inner thermocouple member and having an inwardly rounded outer end provided with a port in register with said first mentioned port, the inwardly rounded outer end of said inner thermocouple member being joined to the inwardly rounded outer end of said outer thermocouple member peripherally about the edges of said ports to form a "hot" thermojunction for direct contact with the flame, a metallic fuel supply tube connected to the opposite end of said inner thermocouple member and constituting a thermoelectric lead conductor for said inner thermocouple member, the side wall of said outer thermocouple member being spaced from said inner thermocouple member for the entry of air therebetween, port means opening laterally through the wall of said inner thermocouple member at the inner end thereof for the entry of air into said inner thermocouple member from the space between said inner and outer thermocouple members, port means opening laterally through the walls of said inner and outer thermocouple members adjacent the outer ends thereof for maintaining flames which sweep over the rounded outer end of the outer thermocouple member adjacent said "hot" thermojunction, and lead conductor means for said outer thermocouple member, said last mentioned lead conductor being joined to said outer thermocouple member externally of the inner end thereof.

4. In combination, an inner metallic tubular thermocouple member having an inwardly rounded outer end provided at its outer end with a port for a pilot flame, an outer metallic tubular thermocouple member surrounding said inner thermocouple member and having an inwardly rounded outer end provided at its outer end with a port in register with said first mentioned port, the inwardly rounded outer end of said inner thermocouple member being joined to the inwardly rounded outer end of said outer thermocouple member peripherally about the edges of said ports to form a "hot" thermojunction for direct contact with the flame, a pilot supply head connected to the inner end of said inner thermocouple member and having an axial orifice for delivering fuel into said inner thermocouple member, a metallic fuel supply tube clamped to said pilot head for supplying fuel to said inner thermocouple member and constituting a thermoelectric lead conductor for said inner thermocouple member, the side wall of said outer thermocouple member being spaced from said inner thermocouple member adjacent said pilot head for the entry of air, port means opening laterally through the wall of said inner thermocouple member outwardly of said pilot head for the entry of air into said inner thermocouple member from the space between said inner and outer thermocouple members, port means opening laterally through the walls of said inner and outer thermocouple members adjacent the outer ends thereof for maintaining flames which sweep over the rounded outer end of the outer thermocouple member adjacent said "hot" thermojunction, and lead conductor means for said outer thermocouple member.

5. In combination, an inner metallic tubular thermocouple member having an inwardly rounded outer end provided with a port for a pilot flame, and an outer metallic tubular thermocouple member surrounding said inner thermocouple member and having an inwardly rounded outer end provided with a port in register with said first mentioned port, the inwardly rounded outer end of said inner thermocouple member being joined to the inwardly rounded outer end of said outer thermocouple member peripherally about the edges of said ports to form a "hot" thermojunction for direct contact with the flame.

HAROLD A. MANTZ.